Figure 1:
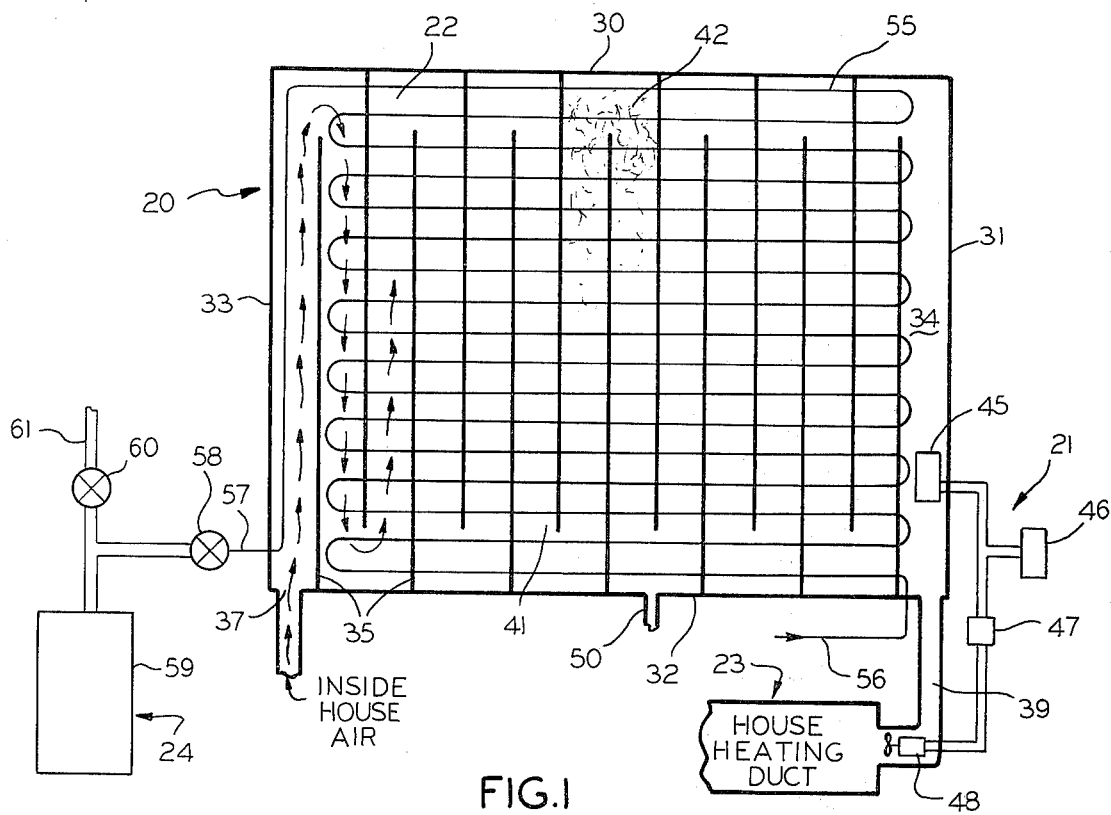

United States Patent [19]
Pyle

[11] 3,902,474
[45] Sept. 2, 1975

[54] SOLAR HEAT CONVERTER
[76] Inventor: Donald L. Pyle, 810 Illini Dr., Pontiac, Ill. 61764
[22] Filed: Mar. 25, 1974
[21] Appl. No.: 454,247

[52] U.S. Cl. .................. 126/270; 126/271; 237/1 A
[51] Int. Cl. ............................................. F24j 3/02
[58] Field of Search ............. 126/270, 271; 237/1 A

[56] References Cited
UNITED STATES PATENTS
| 984,585 | 2/1911 | McHenry | 126/271 X |
| 2,484,127 | 10/1949 | Stelzer | 237/1 A |
| 2,595,905 | 5/1952 | Telkes | 237/1 A |
| 2,680,565 | 6/1954 | Lof | 237/1 A |
| 3,102,532 | 9/1963 | Shoemaker | 126/270 |
| 3,250,269 | 5/1969 | Sherock | 126/271 |

OTHER PUBLICATIONS
Bliss, R. W., "Fully Solar Heated House," Air Conditioning, Heating, and Ventilating, Oct., 1955, pp. 92–97.

Primary Examiner—William F. O'Dea
Assistant Examiner—Peter D. Ferguson
Attorney, Agent, or Firm—Alter and Weiss

[57] ABSTRACT

A solar heat converter comprises a box of any convenient size with a maze of air passageways within the box. The passageways are partially filled with shredded heat conductive material, preferably having a black color. The heated air is forced through the passageways by means of fans or pumps, and the interior of the box is exposed to sunlight by a covering of thermal glass. In operation, the solar heat converter collects heat which is measured by an internal thermostat. The fans are operated to force heated air through an area to be heated in response to temperatures set on this and another thermostat in the area.

12 Claims, 3 Drawing Figures

SOLAR HEAT CONVERTER

This invention relates to solar energy converters and more particularly to means for heating air or fluids, especially although not exclusively for use in homes.

With the growing scarcity of fuel, it becomes ever more apparent that there is a pressing need for low cost, abundant, and inexhaustible energy sources. The sun is the source of the most abundant, and least exhaustible of all energy. Therefore, a better and more efficient solar energy converter is greatly to be desired.

For the home owner, the greatest single criterion is the economic aspect of a solar converter since his funds are not normally as substantial as, say the space program, for example. Therefore, it is not relevant that there may be expensive converters using a high level of technology. For the home owner, durability is also an important consideration. Housing is generally viewed as having a minimum of, say, a 40 year life, and housing parts, such as a roof, as having a 20 year life. Simplicity and ease of maintenance is another important criterion since the home owner is usually his own handy man, who uses conventional tools and skills.

Accordingly, an object of this invention is to provide low-cost solar energy converters meeting these and other criteria. In this connection, an object is to provide solar energy converters which readily mount on conventional homes, but are not unsightly. Here an object is to provide solar converters which may be either built into new homes or mounted on existing homes.

Another object of the invention is to provide an all-purpose solar energy converter module which may be used in large numbers for heating homes or singly (or in small numbers) for supplying heat to small appliances, such as clothes dryers, for example. Here, an object is to provide solar energy converters of various sizes which may be installed, serviced, and operated on any of many scales by the home-owning handy man. In particular, an object is to provide multipurpose solar energy converters for heating air, water, or other fluids.

In keeping with an aspect of the invention, those and other objects are accomplished by providing a box of any convenient size, which may be used as either a large and permanent installation or a small modular unit for assembly into a mosaic of units. Inside the box is a maze of air passageways partially filled with a shredded heat conductive material, such as aluminum, preferably with black surfaces. The box is a completely closed container with one transparent side exposing the maze to the sun. The entire maze is covered on its exposed side with thermal glass. Fans or pumps (which may or may not be thermostatically controlled) are provided for forcing air or liquid through the maze or pipes extending through the box.

Figure 2:
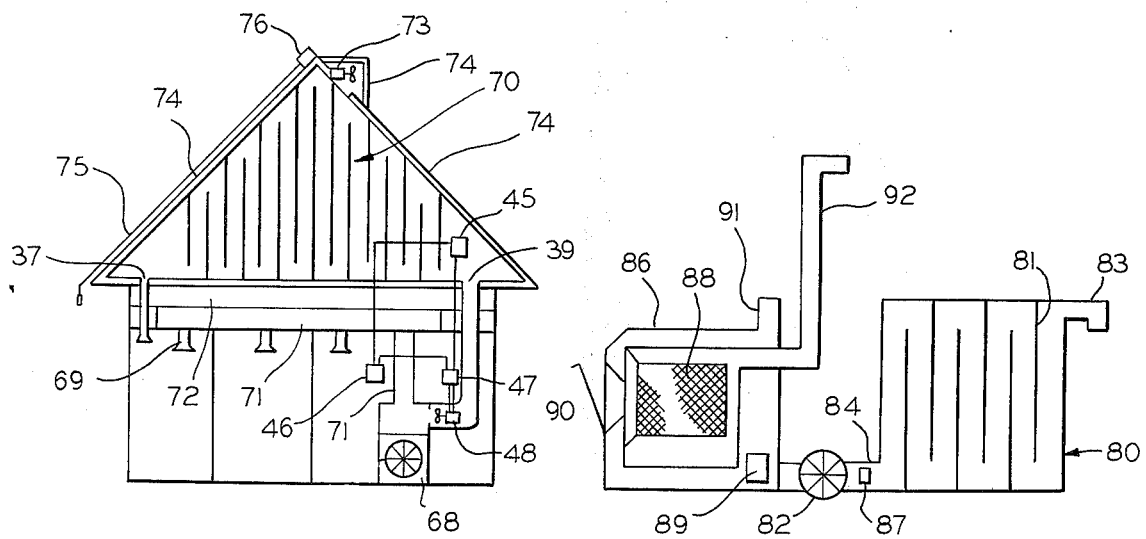
Figure 3:
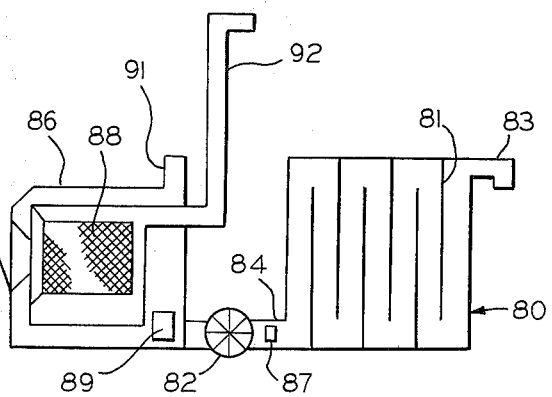

The nature of a preferred embodiment of the invention is shown in the attached drawings, wherein:

FIG. 1 shows an exemplary solar energy converting module, incorporating the principles of the invention;

FIG. 2 schematically shows how the solar energy converter of FIG. 1 may be built into a house; and FIG. 3 schematically shows how the solar energy converting module of FIG. 1 may be adapted for use with home appliances.

The principal elements of a solar energy converting module 20 (FIG. 1) comprises an electrical control circuit 21, and a maze 22 connected to a more or less conventional forced air heating or cooling system 23, and any suitable supplemental appliance 24.

The solar energy converter 20 may be made of any suitable material and in any convenient size. However, in one embodiment, it is made from materials and in sizes which are compatible with conventional building structures and practices. Thus, the outer perimeter panels 30, 31, 32, 33 of the box may be made from insulation or wooden boards, or plastic panels, about an inch thick, six to ten inches wide and two to four feet long. In one particular case, the box was 40-inches long and 28-inches wide. The back 34 of the box may be made from a sheet of any material having suitable strength which may be joined to the sides 30, 31, 32, 33 in an airtight manner. The entire outside of the box may be insulated to reduce or preclude a loss of heat to the surrounding air.

Inside the box are any suitable number of baffles or partitions 35 arranged to form a maze or tortuous air passage. Thus, air entering the box at 37 must follow the path indicated, in part, by arrows until it leaves the box at outlet 39. In the above-cited example of a 40 inch × 28 inch box, there are 13 baffles, each being about 24 inches long, arranged to form fourteen air passageways, one of which is numbered 41. This arrangement forms a maze having folded air passage which is about 28 feet long, and perhaps 2 inches by 8 inches in cross-section.

All of the baffles inside the box--whether insulated or not--are covered by aluminum foil or other material having a good heat conductive material, which may be painted or otherwise colored black. The air passageway inside box 20 contains at least some shredded black aluminum foil or wire 42 in a sufficient quantity to provide a maximum amount of heat exchange, without seriously impeding the air flow inside the passageway.

A thermostat 45 is positioned inside the box near the outlet thereof and adjusted to close an electrical heating control circuit at a predetermined high temperature and to open the circuit at a predetermined low temperature. A thermostat 46 is positioned in a house, appliance, or other area to be heated by the solar energy converter. This thermostat 46 is connected in series with the thermostat 45 and is arranged to close the heating control circuit at a selected low temperature and to open it at a related high temperature.

The two thermostats 45, 46 cooperate to control a relay or other device 47 in order to demand heat when the house or other area is colder than the temperature selected by thermostat 46, if there is a sufficiently high level of heat in the solar energy converter 20. A circuit which is completed by relay 47 operates a fan 48 which draws air from the house through inlet port 37, the maze inside the box, and the outlet 39 to the fan 48. A conventional forced air heating system conveys the heated air through the house and back to inlet port 37.

If the temperature in the solar energy converter 20 is not then hot enough, thermostat 45 is not closed, and relay 47 does not operate. A conventional furnace is then turned on in a normal manner by the thermostat 46. It is thought that such a supplementary use of a conventional furnace would be required only on extremely overcast and very cold days. However, such usage depends largely upon factors such as the house construction, insulation, storm windows, and the like, which are beyond the scope of the invention.

A water drain 50 is formed in the bottom of the box to drain off condensation.

Any suitable number of the solar energy converters 20 may be formed into a mosaic by connecting their inlets 37 to their outlets 39--either in series or in parallel--to thereby form a single passageway from the house through one inlet 37 and out a final outlet 39.

Supplementing the air flow may be a fluid system comprising a pipe 55 which follows a serpentine path through the box. Thus, the fluid may be pumped through piping 55 to a point where it collects and stores heat generated by the solar energy falling on the converter 20. By way of example, the drawing shows an input connection 56 for leading the pipe to a city water supply, which furnishes suitable fluid pressure. The output end 57 of pipe 55 is coupled through a valve 58 to a hot water tank 59. As an alternative, valve 60 may also provide means for drawing water directly from the city water supply 61 and into the hot water tank 59. The hot water in tank 59 may be for any use--such as the normal hot water supply, for example. Of course, any other appliance requiring a heated fluid may be substituted for the hot water tank 59. In another example, the tank 59 may have a substantial size to provide means for accumulating substantial amounts of heated fluids for heating the house via a conventional hot water distribution system. Further, different fluids may be substituted for water depending upon the user's needs. For example, some of the wellknown refrigerant gases or liquid may be used.

For an existing house, a plurality of the modules of FIG. 1 may be placed in a mosaic assemblage on top of the roof. For new housing, the solar converter may be constructed as taught in FIG. 2.

In greater detail, the maze 70 is preferably built into the attic area or between roof and ceiling of a house to provide a folded air passage, much as described above in connection with FIG. 1. The air passage folded into the maze 70 is connected into the normal duct work 71 of a forced air furnace 68 having blower and room vents 69. The flow of air through the duct is controlled by fan 48 and thermostats 45, 46. Insulation 72 is interposed between the maze 70 in the attic and the living space in the house.

For summer months, an exhaust fan 73 may draw hot air from the attic maze 70 and vent it through an open insulated door 74, which is normally closed during the winter months.

Also, at least a part of the roof 74 of the house is covered by thermal glass to expose the maze to the sun during the winter months and thereby heat the air. To cover the thermal glass during summer months a light reflective awning 75 may be unrolled from a box 76 permanently mounted on the roof. Alternatively, a number of louvers may be attached to the roof. A preferred approach is to mechanize the louvers so that they may be opened in the winter and closed in the summer. Another approach is to cover the thermal glass on the roof 74 with louvers preset at an angle which does not block the passage of the angularly slanted winter rays of sunlight, but does block passage of the less slanted summer rays of sunlight. This alternative of using preset louvers has the obvious disadvantage that much less than the full day of solar energy is available for heating the house.

For appliance usage (FIG. 3), the solar energy converter 80 simply sets at a convenient place outdoors, as in a backyard, where it is struck by the suns rays. Again, essentially the same type of maze 81 is built into the converter with the thermal glass facing the sun exposure. A suitable blower or fan 82 draws fresh outside air through an inlet duct 83, the maze 81, and an outlet duct 84 to the appliance 86, here shown as a clothes dryer, by way of example. Since a dryer, such as this does not depend upon critical heat control, the thermostats may be eliminated. However, it is also within the scope of the invention to provide a controllable fresh air inlet vent 87 between the solar converter 80 and fan 82 to mix fresh air with the heated air when more precisely controlled air temperatures are desirable. Any suitable temperature controlled servo system may open or close vent 87.

The dryer 86 is here shown as having the usual tumbler 88, motor 89, front loading door 90, control panel 91, and exhaust vent 92. However, this is merely representative of appliance usage. Any other suitable appliance may also be used in connection with the solar energy converter.

Since those skilled in the art will readily perceive various modifications, the appended claims are to be construed to cover all equivalents falling within the scope and spirit of the invention.

I claim:

1. A solar heat converter comprising a box having therein a plurality of baffle means made of a material having a good heat conductive characteristic, said baffle means being positioned to form a folded passageway extending from an inlet port to an outlet port, bulk heat conductive means in said folded passageway in an amount which facilitates heat exchange without unduly blocking the flow of air in said passageway, thermal glass panel means at least partially covering said box and exposing the interior of said passageway to the sun's rays, said box also containing a piping system following a serpentine path through said box, and said piping system containing a fluid which is heated within said box by the air going through the passageway as well as by the radiant energy passing through said thermal glass panel means.

2. The solar heat converter of claim 1 wherein said box is an airtight container except for said inlet and outlet ports, and means for insulating said box on the outside surface to preclude loss of heat to surrounding air.

3. The solar heat converter of claim 1 wherein said passageway is in the form of a maze folded back upon itself, said maze being formed by a plurality of said baffle means arranged in a spaced parallel relationship within said box, said baffle means being insulating panels covered by heat conductive foil material colored black.

4. The solar heat converter of claim 3 wherein said maze is partially filled with black colored shredded aluminum foil material.

5. The solar heat converter of claim 1 and heat control means comprising a first thermostat means within said box and second thermostat means in the area being heated, said first thermostat means being adjusted to open and close a heating control circuit at predetermined temperatures within siad box, said second thermostat means being set to command heat when the heated area is cooled to a predetermined temperature, and fan means operated jointly by said two thermostat means to force air through said passageway when box temperatures are high and area temperatures are low.

6. The solar heat converter of claim 5 wherein said first and second thermostat means control relay means, and means responsive to the operated or released condition of said relay means for either operating said fan means or starting a furnace.

7. The solar heat converter of claim 6 and means whereby said relay means operates when the temperature within said solar energy converter is above a required minimum and the temperature in said area is below a certain minimum.

8. The solar heat converter of claim 1 and means for connecting the outlet of said passageway to an appliance.

9. A solar heat converter comprising an enclosure containing a plurality of baffle means which define an air passageway and a piping system following a serpentine path with thermal glass on one side of said enclosure facing toward the sun, said thermal glass exposing both said passageways and said piping system to the sun's rays, said baffle means directing the air in said passageway repeatedly over said piping system to aid in warming the contents of said piping system, and thermostat means for controlling the accumulation of heat in said enclosure.

10. The solar heat converter of claim 9 and means for covering said thermal glass in summer months, said covering means comprising a reflective awning.

11. The solar heat converter of claim 10 wherein said enclosure is a home attic.

12. The solar heat converter of claim 11 wherein said enclosure is an outdoor box attached to an appliance, said outdoor box having a fresh air inlet, and means for controlling said inlet for regulating air temperatures within said appliance.

* * * * *

UNITED STATES PATENT OFFICE
CERTIFICATE OF CORRECTION

PATENT NO. : 3902474
DATED : September 2, 1975
INVENTOR(S) : Donald L. Pyle

It is certified that error appears in the above-identified patent and that said Letters Patent are hereby corrected as shown below:

Column 6, Claim 11: After "claim", "10" should be --9--.

Signed and Sealed this twenty-third Day of December 1975

[SEAL]

Attest:

RUTH C. MASON
*Attesting Officer*

C. MARSHALL DANN
*Commissioner of Patents and Trademarks*